J. H. SHAW.
FOOD CHOPPER.
APPLICATION FILED AUG. 19, 1901.
899,702.
Patented Sept. 29, 1908.
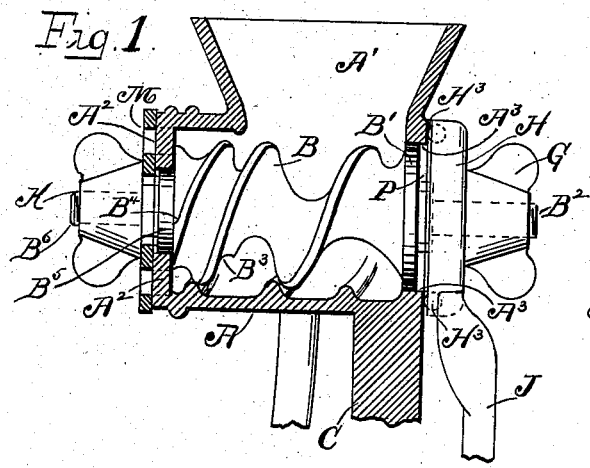
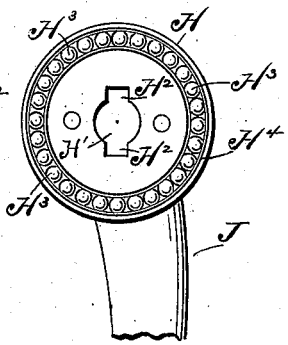
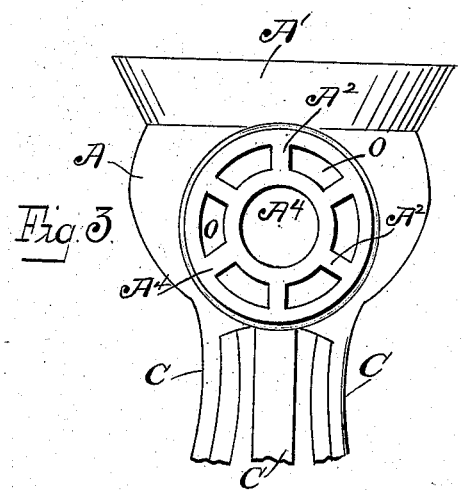
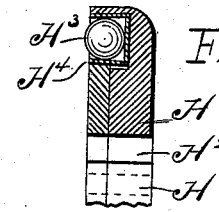
WITNESSES:
INVENTOR
John H. Shaw
BY
Beach Fisher
ATTORNEYS

UNITED STATES PATENT OFFICE.

JOHN H. SHAW, OF NEW HAVEN, CONNECTICUT, ASSIGNOR TO SARGENT AND COMPANY, OF NEW HAVEN, CONNECTICUT, A CORPORATION OF CONNECTICUT.

FOOD-CHOPPER.

No. 899,702.  Specification of Letters Patent.  Patented Sept. 29, 1908.

Application filed August 19, 1901. Serial No. 72,566.

*To all whom it may concern:*

Be it known that I, JOHN H. SHAW, of the city and county of New Haven, State of Connecticut, have invented a new and useful Improvement in Food-Choppers, of which the following is a full, clear, and exact description, when taken in connection with the accompanying drawings, which form a part thereof, and in which—

Figure 1, represents a vertical longitudinal central section through a food chopper embodying my invention, Fig. 2, a front detail view of the rear cap and crank, Fig. 3, a front end view in detail of the case, Fig. 4, a side elevation in detail of the forcing screw, and Fig. 5, a central vertical section through the rear cap.

In all figures, similar letters of reference represent like parts.

My invention relates to an improvement in food choppers, the object being to produce a simple, durable, and easy running food chopper constructed with particular reference to a novel and efficient method for adjusting the relation between the cutting blades or shoulders on the forward end of the forcer or feed screw and the stationary cutters, and a novel device for greatly reducing the friction in the mountings for the feed screw, by means of a ball bearing cap on the rear end of the forcer or feed screw.

Referring to the drawings for a more particular description, the part designated by letter A represents the case of a food chopper with its hopper A', with its mounting brackets C.

B is the forcer or feed screw extending through the case. The case A has an opening in its forward end and an assembling opening P in its rear end. The forcing or feed screw B is adapted to be entered into and removed from the case through said assembling opening. Said screw is formed at its rear end with a circular bearing head or closure B' fitting closely within the assembling opening and having bearings upon the inner surface $A^3$ of said rear end opening. The rear end of the forcing screw is provided with a threaded stem $B^2$ on its axle line, receiving a thumb nut G, which is screwed down upon the flat external face of a disk-shaped cap H, formed with a central opening H', adapted to permit it to pass over the threaded stem $B^2$, and with two coupling pin slots $H^2$ leading out of the opening and receiving coupling pins mounted in the rear hub, provided for locking the screw forcer to said disk-shaped cap. A crank J for a handle, by means of which the screw forcer is made to rotate may be rigidly secured or formed integral with said disk-shaped cap.

The balls $H^3$ are placed in an annular ball bearing case or channel $H^4$ set into an annular recess made just within the rim of the flat internal face of said disk-shaped cap, or bearing flange. The two sides of said ball bearing case are inwardly grooved so that the mouth of said channel is smaller than the diameter of the balls, thus retaining the balls in place when the cap is removed from the case. This channel groove may be separate and fitted into the groove in the face of the cap. Said disk-shaped ball bearing cap H may be detached after simply removing said thumb nut G from the projecting threaded stem of the screw forcer. Said screw forcer B is formed with a feeding thread $B^3$ of very coarse pitch, such as I have described in my specifications for Letters Patent granted #623,839, ending with one or more integral shoulders, or cutting blades, $B^4$, at its outer end, adapted to coact with the inner face of the stationary cutters $A^2$ herein shown formed integral with the forward ends of the case A.

An integral centrally-arranged bearing hub $B^5$ projecting beyond the cutting blades formed at the outer end of the forcer fits into a centrally-arranged bearing opening $A^4$ in the integral end closure cap or stationary cutters $A^2$, at the extreme outer end of the case A. Between said stationary cutters are formed a series of discharge openings O grouped around said bearing opening. Said bearing hub $B^5$ supports the outer end of the screw forcer B and is formed at its outer end with a threaded stem $B^6$ projecting from the center of said bearing hub, receiving a thumb-nut K, which is screwed down upon a disk-shaped cutter, or perforated plate M, which is so arranged as to pass over the threaded projection $B^6$ and rotate with the screw forcer. The inner face of the perforated plate or disk-shaped cutter M when forced rearward by the thumb-nut K fits closely against and rides upon the outer face of the stationary cutter $A^2$, thus serving the two-fold purpose of a cutter, and bearing flange for the outer end of the screw forcer.

My invention provides for an adjustment of the cutting blades on the feed screw to the stationary cutters, separate from the mountings of the forcing screw by mounting my forcing screw against opposing bearings on the case with bearing flanges, both of which are adjustable on the feed screw.

In prior devices, the feed screw when assembled has been held against the longitudinal movement in one direction by a flange or other part integral with the case or feed screw, so that the relation between the knives on the forward end of the forcing screw and the stationary cutter cannot be varied without varying the relation between the perforated plate or outside rotary cutters and the stationary cutter.

In the particular application of the invention described herein the forcer is made somewhat shorter than the distance between the outside of the rear end of the case and the inside of the cutters, and by making the flange at the rear adjustable on that end of the forcing screw as is the perforated plate on the forward end, it is possible to vary the position of the forcing screw in regard to both bearings and thus adjust the relation of the inner cutting blades, which are at the end of the forcing screw, with the inner face of the stationary cutters as may be desired, without affecting the relation of the perforated plate with the outer face of stationary cutter. When the outer thumb-nut is screwed up, so that the perforated cutter bears on the stationary cutters; the cutting blades on the forcer will be adjusted to the proper relation with the stationary cutters. As the rear cap is screwed up against the rear end of the case the ball bearings relieve the friction.

It will be understood from the foregoing description that by loosening one of the thumb-nuts and tightening the other the relation between the cutting blades on the end of the forcer and the stationary cutters may be changed and still maintain the proper bearing on the two opposing bearing flanges.

I do not limit myself to the exact construction shown and described, but hold myself at liberty to make such departures therefrom as fairly fall within the spirit and scope of my invention.

Having substantially described my invention, what I claim as new and desire to secure by Letters Patent, is—

In a food chopper or kindred instrumentality, the combination with the case, having an opening at its rear; a cutting plate rigidly secured against movement in its forward end; a forcing screw adapted to be inserted at the rear opening of said case, having a bearing in said case at the rear and axial shafts at both ends, the forward shaft projecting through and journaled in the rigid cutting plate; a rotary cutter adjustably mounted on the forward shaft outside of said rigid cutting plate; an adjustable plate mounted on said rear shaft and bearing on said casing; and devices on said axial shafts coacting with said rotary cutter and adjustable plate to adjust said forcing screw longitudinally within said casing, substantially as described.

In witness whereof I have hereunto set my hand on the 16th day of Aug., 1901.

JOHN H. SHAW.

Witnesses:
 LE ROY J. KIRKHAM,
 ALICE A. WILSON.